(12) United States Patent
Takamatsu et al.

(10) Patent No.: US 8,213,407 B2
(45) Date of Patent: Jul. 3, 2012

(54) WIRELESS COMMUNICATION SYSTEM, MOBILE STATION, BASE STATION, AND WIRELESS COMMUNICATION METHOD

(75) Inventors: Nobuaki Takamatsu, Kanagawa (JP); Yasuhiro Nakamura, Kanagawa (JP)

(73) Assignee: Kyocera Corporation (JP)

( * ) Notice: Subject to any disclaimer, the term of this patent is extended or adjusted under 35 U.S.C. 154(b) by 98 days.

(21) Appl. No.: 12/934,542

(22) PCT Filed: Mar. 27, 2009

(86) PCT No.: PCT/JP2009/056398
§ 371 (c)(1),
(2), (4) Date: Sep. 24, 2010

(87) PCT Pub. No.: WO2009/119857
PCT Pub. Date: Oct. 1, 2009

(65) Prior Publication Data
US 2011/0287768 A1 Nov. 24, 2011

(30) Foreign Application Priority Data
Mar. 28, 2008 (JP) ................................. 2008-085141

(51) Int. Cl.
*H04J 3/06* (2006.01)
(52) U.S. Cl. ......... 370/350; 370/281; 455/226; 455/315
(58) Field of Classification Search .................. 455/522, 455/509, 464, 422.1, 436; 370/350, 281, 370/226, 315, 329
See application file for complete search history.

(56) References Cited

U.S. PATENT DOCUMENTS

| 5,574,971 | A | 11/1996 | Aihara |
| 5,805,993 | A | 9/1998 | Cherpantier et al. |
| 6,421,538 | B1 | 7/2002 | Byrne |
| 2001/0044306 | A1 | 11/2001 | Shimono et al. |
| 2002/0068581 | A1 | 6/2002 | Salonaho |
| 2003/0013452 | A1 | 1/2003 | Hunt et al. |
| 2009/0042596 | A1* | 2/2009 | Yavuz et al. .................. 455/522 |
| 2009/0092122 | A1* | 4/2009 | Czaja et al. ................... 370/350 |

FOREIGN PATENT DOCUMENTS

| GB | 2 273 424 A | 6/1994 |
| JP | 07-212817 | 8/1995 |
| JP | 09-139974 | 5/1997 |
| JP | 10-271552 | 10/1998 |
| JP | 11-252613 | 9/1999 |
| JP | 2001-320751 | 11/2001 |
| JP | 2002-118873 | 4/2002 |
| JP | 2004-535143 | 11/2004 |
| WO | 98/52374 A2 | 11/1998 |

OTHER PUBLICATIONS

International Search Report; PCT/JP2009/056398; Jul. 14, 2009.
Arib Standard, OFDMA/TDMA Broadband Wireless Access System (Next Generation PHS), ARIB STD-T95 Ver. 1.0, p. 318-319, [online], Dec. 12, 2007, ARIB, [retrieved on May 13, 2009], retrieved from the Internet "http://www.arib.or.jp/english/html/overview/doc/1-STD-T95v1_0.pdf".
The extended European Search Report dated Dec. 12, 2011; Application No. / Patent No. 09724189.7-2412/2257102 PCT/JP2009056398.

* cited by examiner

*Primary Examiner* — Phuoc Doan
(74) *Attorney, Agent, or Firm* — Studebaker & Brackett PC; Donald R. Studebaker

(57) ABSTRACT

One object of the present invention is to improve stability of wireless communication, regardless of a movement speed of a mobile station by estimating a movement speed of a mobile station using a signal prepared in advance for a used standard and selecting an appropriate base station. In the wireless communication system 100 according to the present invention, in order to adjust a timing of receiving data from the PHS terminal 110 to a desired timing, base stations 120, 122 transmit an adjustment signal for advancing or delaying data transmission timing in the PHS terminal 110. Thus, the PHS terminal 110 calculates a bias amount of such an adjustment signal to determine high speed movement of the PHS terminal 110 and perform handover from a micro cell base station 120 to a macro cell base station 122.

11 Claims, 11 Drawing Sheets

WIRELESS COMMUNICATION SYSTEM, MOBILE STATION, BASE STATION, AND WIRELESS COMMUNICATION METHOD

TECHNICAL FIELD

The present invention relates to a wireless communication system, a mobile station, a base station, and a wireless communication method, which perform handover between a micro cell base station and a macro cell base station under a communication environment where a micro cell and a macro cell are overlapped.

BACKGROUND ART

In a wireless communication system such as PHS (Personal Handy phone System) performing wireless communication within a communication area by dividing the communication area into a plurality of micro cells and providing a base station for each of the micro cells, so-called handover which changes a base station as a communication object due to movement between the micro cells frequently occurs, so that there has been difficulty in maintaining communication quality. In addition, during high speed movement in subway, especially, in a bullet train or an automobile, handover between micro cell base stations cannot be performed timely, and thereby causing call disconnections.

The frequency of handovers can be reduced by simply broadening communication coverage of micro cells to be macro cells. However, since advantages of micro cells are lost, it is concerned that wireless capacity would be reduced in an area where traffic to a base station is high.

Thus, a technique of providing a communication area where a micro cell and a macro cell are overlapped and selecting a cell in accordance with a current communication condition has been disclosed (for example, JP-A-2004-535143). In addition, a technique of calculating a speed of a mobile station based on a stay time period in a micro cell (for example, JP-A-H9-139974) or by using a speed sensor and performing changeover between a micro cell and a macro cell in accordance with the speed has been disclosed.

DISCLOSURE OF THE INVENTION

Problem to be Solved by the Invention

However, in the above-described related art, in order to detect a speed of a mobile station, special programs for measuring a stay time period or special electronic devices such as a speed sensor are required. In addition, if a speed sensor is used, complicated calculation processes are accompanied to calculate a scalar quantity in one direction from speed sensors of three axes. This has been a main obstacle in reducing the cost, size and weight of a mobile station.

In the meantime, in recent years, in a mobile station represented by PHS (Personal Handy phone System), a high speed and high quality wireless communication method has been introduced. For example, as a standard for next-generation PHS communication capable of performing high speed digital communication, ARIB (Association of Radio Industries and Businesses) STD T95 or PHS MoU (Memorandum of Understanding) has been studied.

In ARIB STD T95 or PHS MoU, an OFDM (Orthogonal Frequency Division Multiplexing) system is employed. The OFDM system is classified as one category of the multiplexing system and uses a plurality of carrier waves on a unit time axis, and frequency bands of the carrier waves are partly overlapped with one another so that, in adjacent carrier waves, the phases of signal waves to be modulated are orthogonal to each other, whereby the frequency band is effectively used. While OFDM assigns sub-channels by time division to individual users, there is provided OFDMA (Orthogonal Frequency Division Multiplexing Access), which allows a plurality of users to share all sub-channels and assigns sub-channels having the highest transmission efficiency to each user.

In addition, in ARIB STD T95 or PHS MoU, in FM-mode (Fast access channel based on Map-Mode), an anchor channel for exchanging various control signals between a mobile station and a base station in advance is provided, and MCS (Modulation and Coding Scheme) for performing adaptive modulation, a map of an extra channel, and others are presented. The inventors of the present application have focused on SD (Shift Direction) as an adjustment signal for adjusting data receiving timing in a base station and have discovered that by using SD, it is possible to easily select an appropriate base station without requiring complicated programs or additional electronic devices.

In view of the above-described problem, an object of the present invention is to provide a wireless communication system, a mobile station, a base station, and a wireless communication method, which are capable of estimating a movement speed of a mobile station by using a signal prepared in advance for a used standard and selecting an appropriate base station so as to improve stability of wireless communication, irrespective of the movement speed of the mobile station.

Means to Solve the Problem

According to one aspect of the present invention, there is provided a wireless communication system including a mobile station, a plurality of base stations which are capable of performing wireless communication with the mobile station and which include a micro cell base station configuring a micro cell and a macro cell base station configuring a macro cell larger than the micro cell, and a control server which controls handover between the plurality of base stations, wherein each of the base stations includes an adjustment signal transmission unit which transmits an adjustment signal for advancing or delaying data transmission timing in the mobile station in order to adjust timing for receiving data from the mobile station to a desired timing, and wherein the mobile station includes a timing adjustment unit which receives the adjustment signal and adjusts the data transmission timing. The wireless communication system further includes a bias amount calculation unit which calculates a bias amount of the adjustment signal, a carrier sense performing unit which, if the bias amount a first threshold value or higher and if a base station, with which the mobile station is performing wireless communication, is a micro cell base station, performs carrier sense for changing over into connection with a macro cell base station, and a handover request unit which selects one macro cell base station from one or more of macro cell base stations extracted through the carrier sense and which requests handover to the selected macro cell base station, to the control server. The control server includes a handover performing unit which performs handover from the micro cell base station which is performing wireless communication with the mobile station, to the selected macro cell base station, in response to the handover request. Herein, the adjustment signal may be SD (Shift Direction) in an anchor channel in a PHS communication standard MoU. Further, the bias amount calculation unit, the carrier sense performing unit, and the handover request unit may be included in the mobile station.

In the above configuration, a macro cell is provided to form an umbrella structure with respect to micro cells. During ordinary times when a mobile station is stopped or moves with a low speed, communication quality is secured through the micro cells. If high speed movement is detected, communication coverage is broadened through the macro cell. In order to detect a movement speed, a signal (adjustment signal) prepared in advance for a used standard is employed. According to a bias amount of the adjustment signal, handover from the micro cell to the macro cell is performed. In this way, the frequency of handovers during high speed movement can be reduced, so that stability of wireless communication can be improved.

If the bias amount is a second threshold value or lower, which is lower than the first threshold value, and if a base station, with which the mobile station is performing wireless communication, is a macro cell base station, the carrier sense performing unit may perform carrier sense for changing over into connection with a micro cell base station. The handover request unit may select one micro cell base station from one or more of micro cell base stations extracted through the carrier sense and requests handover to the selected micro cell base station. The handover performing unit may perform handover from the macro cell base station which is performing wireless communication with the mobile station, to the selected micro cell base station, in response to the handover request.

If the movement speed is reduced, namely, the bias amount is a second threshold value or lower, in order to increase the communication quality, the mobile station, in which the communication coverage has been fully changed over from the micro cell to the macro cell due to the high speed movement, requests that the macro cells be returned to micro cell. In this way, stability of wireless communication can be improved, irrespective of the movement speed of the mobile station.

The bias amount may be the number of consecutive times of adjustment signals for either one of advancement or delay. According to this configuration, the consecutiveness of adjustment signals can be detected, so that complete and quick handover between a micro cell and a macro cell can be performed.

The bias amount may be the frequency of adjustment signals for either one of advancement or delay. The frequency of adjustment signals can be obtained from an average of adjustment signals or results of low-pass filtering. According to this configuration, a reasonable bias amount can be calculated even in case of sudden increase or decrease of adjustment signals, so that complete and quick handover between micro cells and macro cells can be performed.

The micro cell base station and the macro cell base station may have an identifier for identifying itself as being either the micro cell base station or the macro cell base station. According to this configuration, it is possible to easily extract only the micro cell base station or the macro cell base station during carrier sense, so that processes can be simplified. Thus, processing burden and time can be reduced.

According to another aspect of the present invention, there is provided a mobile station capable of performing wireless communication with a plurality of base stations including a micro cell base station configuring a micro cell and a macro cell base station configuring a macro cell larger than the micro cell. The mobile station includes a timing adjustment unit which receives an adjustment signal transmitted from a base station being performing wireless communication with the mobile base station in order to adjust a timing for the base station receiving data from the mobile station to a desired timing, and which adjusts the timing of transmitting the data, a bias amount calculation unit which calculates a bias amount of the adjustment signal, a carrier sense performing unit which, if the bias amount is a first threshold value or higher, and if a base station, with which the mobile station is performing wireless communication, is a micro cell base station, performs carrier sense for changing over into connection with a macro cell base station, and a handover request unit which selects one macro cell base station from one or a more of macro cell base stations extracted through the carrier sense and which requests handover to the selected macro cell base station, to a control server which controls handover between the plurality of base stations.

According to a further aspect of the present invention, there is provided a base station capable of performing wireless communication with a mobile station and being either one of a plurality of base stations including a micro cell base station configuring a micro cell and a macro cell base station configuring a macro cell larger than the micro cell. The base station includes an adjustment signal transmission unit which transmits an adjustment signal for advancing or delaying data transmission timing in the mobile station in order to adjust timing for receiving data from the mobile station to a desired timing, a bias amount calculation unit which calculates a bias amount of the adjustment signal, a carrier sense instructing unit which if the bias amount is a first threshold value or higher and if the base station itself is a micro cell base station, instructs the mobile station to perform carrier sense to change over into connection with a macro cell base station, and a handover request unit which selects one macro cell base station from one or more of macro cell base stations extracted through the carrier sense and requests handover to the selected macro cell base station, to a control server.

According to a further aspect of the present invention, there is provided a wireless communication method of performing handover in a wireless communication system including a mobile station, a plurality of base stations including a micro cell base station configuring a micro cell and a macro cell base station configuring a macro cell larger than the micro cell, and a control server which controls handover between the plurality of base stations. The base station transmits an adjustment signal for advancing or delaying data transmission timing in the mobile station in order to adjust timing for receiving data from the mobile station to a desired timing. The mobile station receives the adjustment signal and adjusts the data transmission timing. Either of the mobile station or the base station calculates a bias amount of the adjustment signal, if the bias amount is a first threshold value or higher, and a base station, with which the mobile station is performing wireless communication, is a micro cell base station, performs carrier sense for changing over into connection with a macro cell base station, and selects one macro cell base station from one or more of macro cell base stations extracted through the carrier sense, and requests handover to the selected macro cell base station, to the control server. The control server performs handover from the micro cell base station which is performing wireless communication with the mobile station to the selected macro sell base station, in response to the handover request from the mobile station. The calculating of the bias amount, the performing of carrier sense, and the request for handover may be performed by the mobile station.

The components or the descriptions thereof, which correspond to the technical concept of the wireless communication system described above, are applicable to the corresponding mobile station, the base station, and the wireless communication method.

Effects of the Invention

As described above, in the wireless communication system of the present invention, a movement speed of a mobile station is estimated by using a signal prepared in advance for a used standard to select an appropriate base station, so that stability of wireless communication can be improved, irrespective of the movement speed of the mobile station.

DESCRIPTION OF REFERENCE NUMERALS

Figure 1:
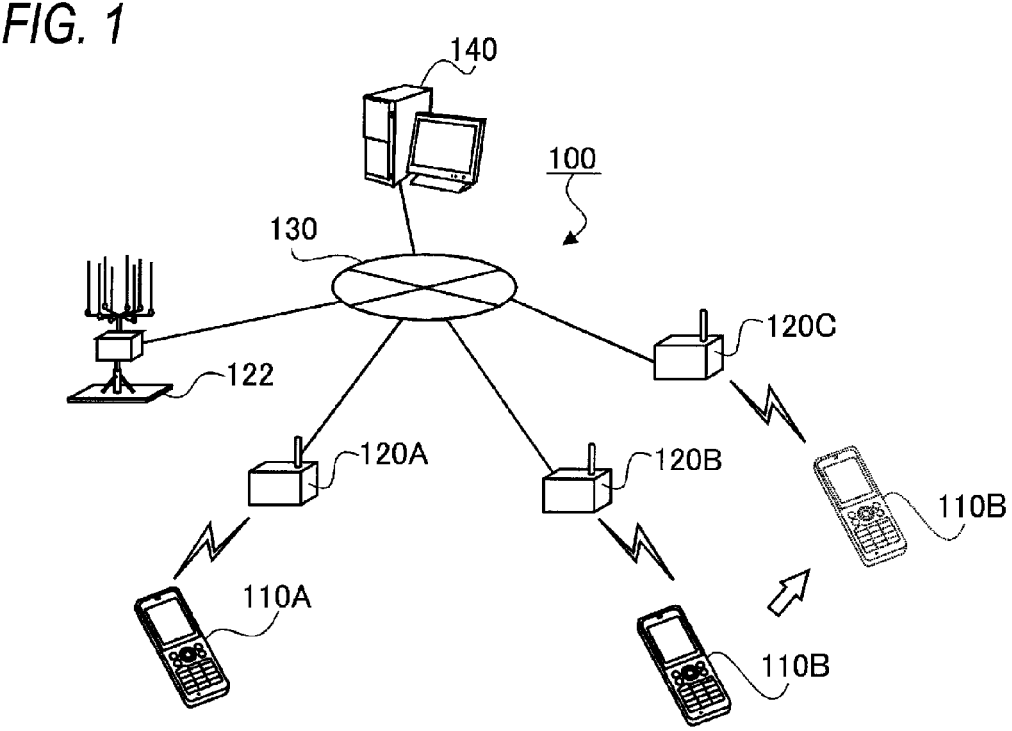
FIG. 1 is a view for explaining general connection relation of a wireless communication system in a first embodiment.

100: wireless communication system
110: PHS terminal (mobile station)
120, 720: micro cell base station
122, 722: macro cell base station
140: control server
150: micro cell
152: macro cell
330: timing adjustment unit
332, 732: bias amount calculation unit
334: carrier sense performing unit
336, 736: handover request unit
732: bias amount calculation unit
734: carrier sense instructing unit

BEST MODE FOR CARRYING OUT THE INVENTION

Hereinafter, a preferable embodiment of the present invention will be described in detail with reference to the accompanying drawings. In the embodiment, dimensions, materials, and other particular numerical values, etc., are merely exemplary to facilitate understanding of the invention and should not be construed as limiting the present invention thereto unless otherwise expressly described herein. Meanwhile, in this specification and the drawings, components having substantially the same functions and configurations are denoted by the same reference numeral to omit repeated explanation, and components having no direct relation with the present invention are not illustrated.

A mobile station which is represented by a PHS terminal and base stations which are fixedly provided with certain intervals configure a wireless communication system for performing wireless communication. In this embodiment, micro cells obtained by dividing a communication area into small areas and macro cells defined as large areas including a plurality of micro cells are managed as one network, and a base station is provided in each of the cells. Herein, an overall wireless communication system will be described, and thereafter, detailed configuration of a PHS terminal as a mobile station, a base station, and a control server will be described. It is noted that although this embodiment describes a PHS terminal as an example of a mobile station, the mobile station is not limited thereto and may include various electronic devices capable of performing wireless communication, such as portable telephones, note-type personal computers, PDAs (Personal Digital Assistant), digital cameras, music players, car navigators, portable televisions, game devices, DVD players, and remote controllers.

(First Embodiment: Wireless Communication System 100)

FIG. 1 is a view for explaining general connection relation of the wireless communication system 100. The wireless communication system 100 includes PHS terminals 110 (110A, 110B), micro cell base stations 120 (120A, 120B, 120C), a macro cell base station 122, a communication network 130 including an ISDN (Integrated Services Digital Network) line, Internet, and a private line, and the like, and a control server 140.

In the wireless communication system 100, when a user makes a connection from a user's PHS terminal 110A to the other PHS terminal 110B through a communication line, the PHS terminal 110A makes a request for wireless connection to the micro cell base station 120A, which lies within communication coverage. Upon receiving the request for wireless connection, the micro cell base station 120A makes a request for communication connection to a communication counterpart to the control server 140 through the communication network 130. The control server 140 selects, for example, the micro cell base station 120B, which exists within wireless communication coverage of the PHS terminal 110B, with reference to location registration information of the other PHS terminal 110B, and thereby securing a communication path between the micro cell base station 120A and the micro cell base station 120B to establish communication between the PHS terminal 110A and the PHS terminal 110B.

Here, if the PHS terminal 110B to be communication counterpart destination moves, the PHS terminal 110B and the micro cell base station 120B become distant, so that wireless communication with the micro cell base station 120B becomes finally difficult. The PHS terminal 110B predicts that wireless communication would become difficult due to conversion of electric field strength of a signal of the micro cell base station 120B, and newly performs carrier sense to request wireless communication with the micro cell base station 102C having high electric field strength to the micro cell base station 120B. Once the micro cell base station 120B delivers the request to the control server 140, the control server 140 performs handover from the micro cell base station 120B to the micro cell base station 120C. This embodiment provides not only handover between the micro cell base stations 120, but also handover between the micro cell base station 120 and the macro cell base station 122.

Figure 2:
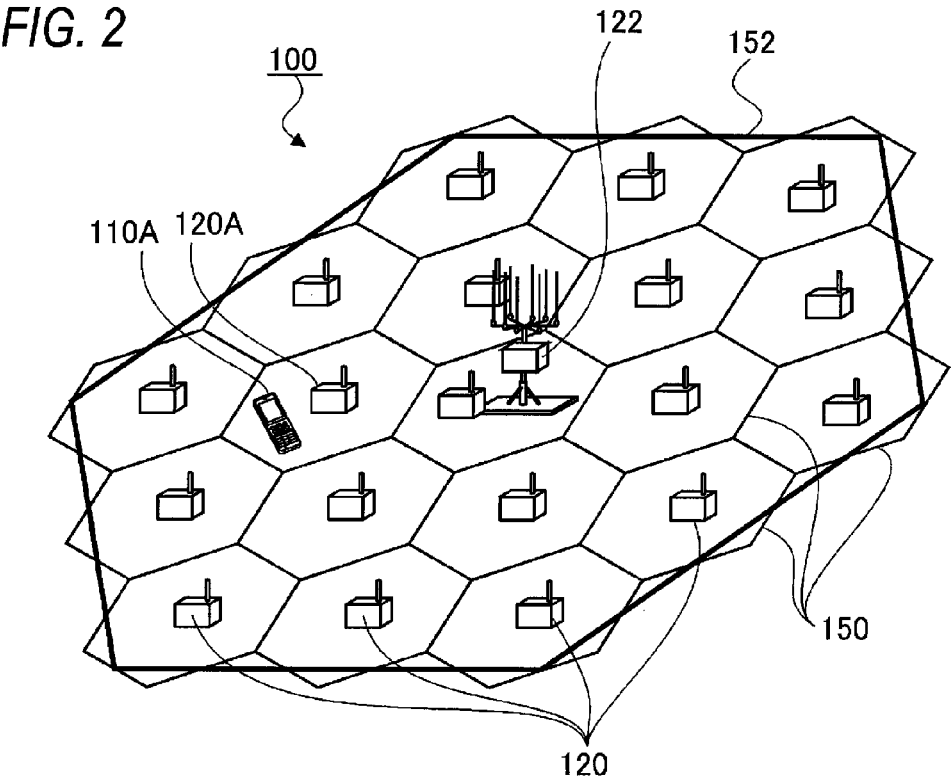
FIG. 2 is a system configuration view showing configuration of a wireless communication system.

FIG. 2 is a system configuration view showing configuration of the wireless communication system 100. Here, two types of cells, i.e., a plurality of micro cells 150 and a macro cell 152 having larger communication coverage than that of the micro cells 150, are overlapped to form an umbrella structure. However, these two types of cells are managed by the same control server 140 in the same wireless communication system 100.

Accordingly, for example, the PHS terminal 110A located within the communication coverage of the micro cell base station 120A can select wireless communication with the macro cell base station 122, in addition to the micro cell base station 120A. Further, handover between the micro cell base station 120A and the macro cell base station 122 can be freely performed. The micro cells 150 and the macro cells 152 have advantages as set forth below according to sizes of their respective communication coverage.

For example, in the micro cells 150, (1) since the distance between the PHS terminals 110 and the micro cell base stations 120 is short (for example, 500 m or shorter), transmission power of the PHS terminals 110 can be reduced, so that it is possible to use the battery for a long time period, (2) since transmission power of the micro cell base stations 120 can also be reduced, miniaturization and weight reduction of the micro cell base stations 120 can be realized, so that installation in a small occupation area is possible, (3) since use efficiency of frequency can be improved, it is possible to enlarge wireless capacity per unit area. In the macro cells 152, since the coverage for communication with the PHS terminals 110 is broad, even in the case where the PHS terminals 110 move with a high speed, it is unnecessary to frequently change the macro cell base station 122 to be a communication object, so that the amount of handovers can be significantly reduced. The PHS terminals 110 select one of the cells according to communication environments or their movement state.

Meanwhile, in the wireless communication system 100, various techniques to improve communication speed and communication quality between the PHS terminals 110 and the micro cell base stations 120 or the macro cell base station 122 have been employed. In this embodiment, for example, the next-generation PHS communication technique such as ARIB STD T95 or PHS MoU is employed, and wireless communication based on a TDD (Time Division Duplex)/OFDMA (or TDD/OFDM) system is performed between the PHS terminals 110 and the micro cell base stations 120 or the macro cell base station 122.

Figure 3:
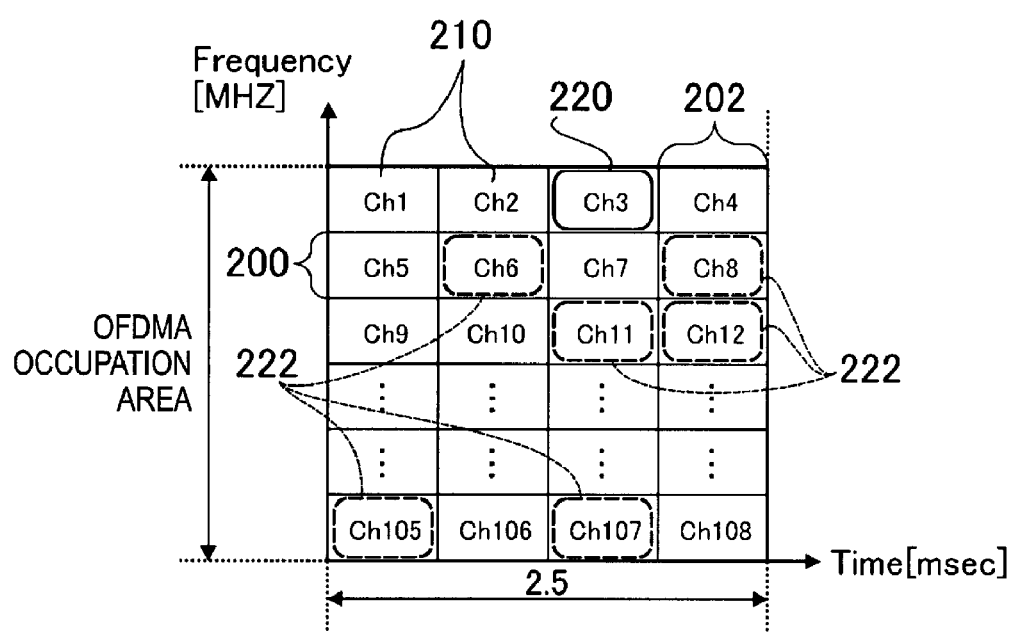
FIG. 3 is a view showing frame configuration of data to be transmitted and received in PHS MoU.

FIG. 3 is a view for explaining frame configuration of data to be transmitted and received in PHS MoU. In OFDMA (or OFDM), a two-dimension map having time axis direction and frequency axis direction is provided, a plurality of channels 200 are arranged in the frequency axis direction with a constant base band distance, and PRU 210 is provided for each TDMA slot 202 in each channel 200.

PRU 210 is defined by an occupation band of 900 kHz according to the base band distance and the duration of 625 nsec by time division. In addition, a frame used for communication with the particular PHS terminal 110 is composed of an anchor channel (ANCH) 220 related to a control signal and an extra channel (EXCH) 222 which stores data.

The anchor channel 220 is a control signal of FM-Mode and includes, for example, MI (Mcs Indicator), MR (Mcs Requirement), an ACK field, a map, and SD (Shift Direction). Here, MI represents an MCS identifier of MCS when data is modulated. MR is MCS requirement of data which is transmitted to itself. From a time standpoint, MI represents MCS used for modulation of data, which are transmitted at the same time with the MCS identifier described above, and MR represents desired MCS at the next time or later. The ACK field represents results of error detection of demodulated data.

A map and SD exist only in a frame of transmission from the micro cell base stations 120 or the macro cell base station 122 to the PHS terminals 110. The map represents assignment of the extra channel 222, and SD represents an adjustment signal for advancing or delaying data transmission timing in the PHS terminals 110 in order to adjust timing for receiving data from the PHS terminals 110 to a desired timing.

The extra channel 222 is PRU 210 allocated for each user as a communication path in an FM-Mode and plural PRU 210 may be assigned to one PHS terminal 110 as indicated by dashed lines in FIG. 3. Assignment of such an extra channel 222 is performed through carrier sense for determining whether PRU 210 is being used by other users. Results of the assignment are shown in a map of the anchor channel 220 as described above.

The above-described SD will be further described in detail. Since the micro cell base station 120 or the macro cell base station 122 performs wireless communication with a plurality of the PHS terminals 110, which are distant therefrom with different distances, communication timing of the micro cell base station 120 or the macro cell base station 122 itself cannot be changed. Thus, the delay time of a communication signal that varies depending on the communication distance has to be corrected in the PHS terminals 110.

In order to maintain orthogonality in OFDM, the micro cell base station 120 or the macro cell base station 122 transmits SD to the PHS terminal 110. If timing for receiving data from the PHS terminal 110 is advanced, transmission timing is adjusted to be delayed. If delayed, transmission timing is adjusted to be advanced. In other words, the micro cell base station 120 or the macro cell base station 122 and the PHS terminal 110 perform closed-loop control of timing for transmitting and receiving data through SD. In this embodiment, although time, during which timings do not match with each other, is not calculated, differences of actual circumstances are on-off controlled by a feedback signal per 5 msec.

Specifically, SD includes two-bit flags. When advancing transmission timing, "2 (2Step Forward)" or "1 (1Step Forward)" is transmitted depending on the degree of advancement. When maintaining current timing, "0 (Stay)" is transmitted, and when delaying transmission timing, "−1 (Shift Back)" is transmitted. Due to the SD, the micro cell base station 120 or the macro cell base station 122 can adjust data receiving timing to appropriate timing at any time, regardless of distance from the PHS terminal 110 to be a communication object.

(PHS Terminal 110)

Figure 4:
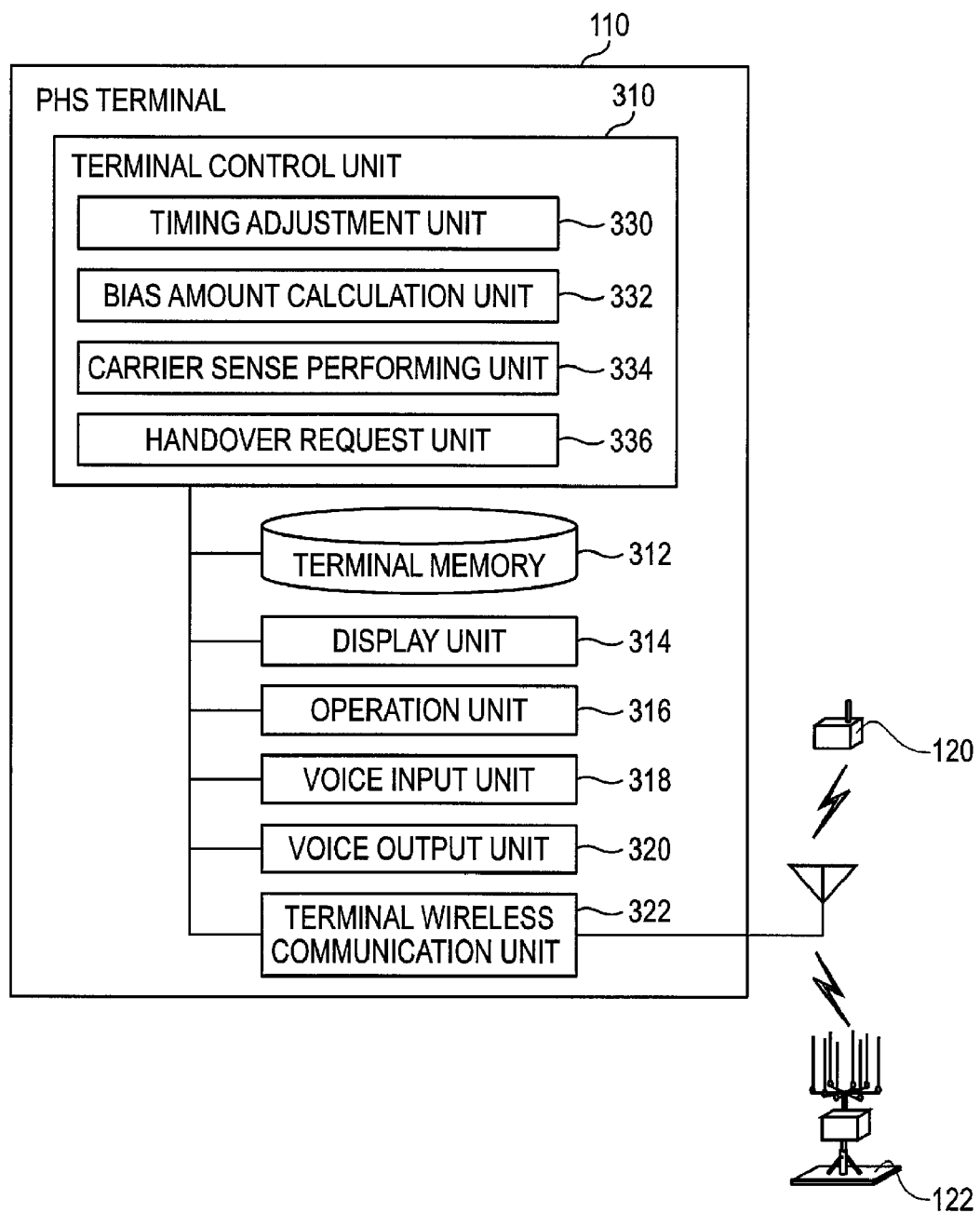
FIG. 4 is a functional block diagram showing hardware configuration of a PHS terminal.
Figure 5:
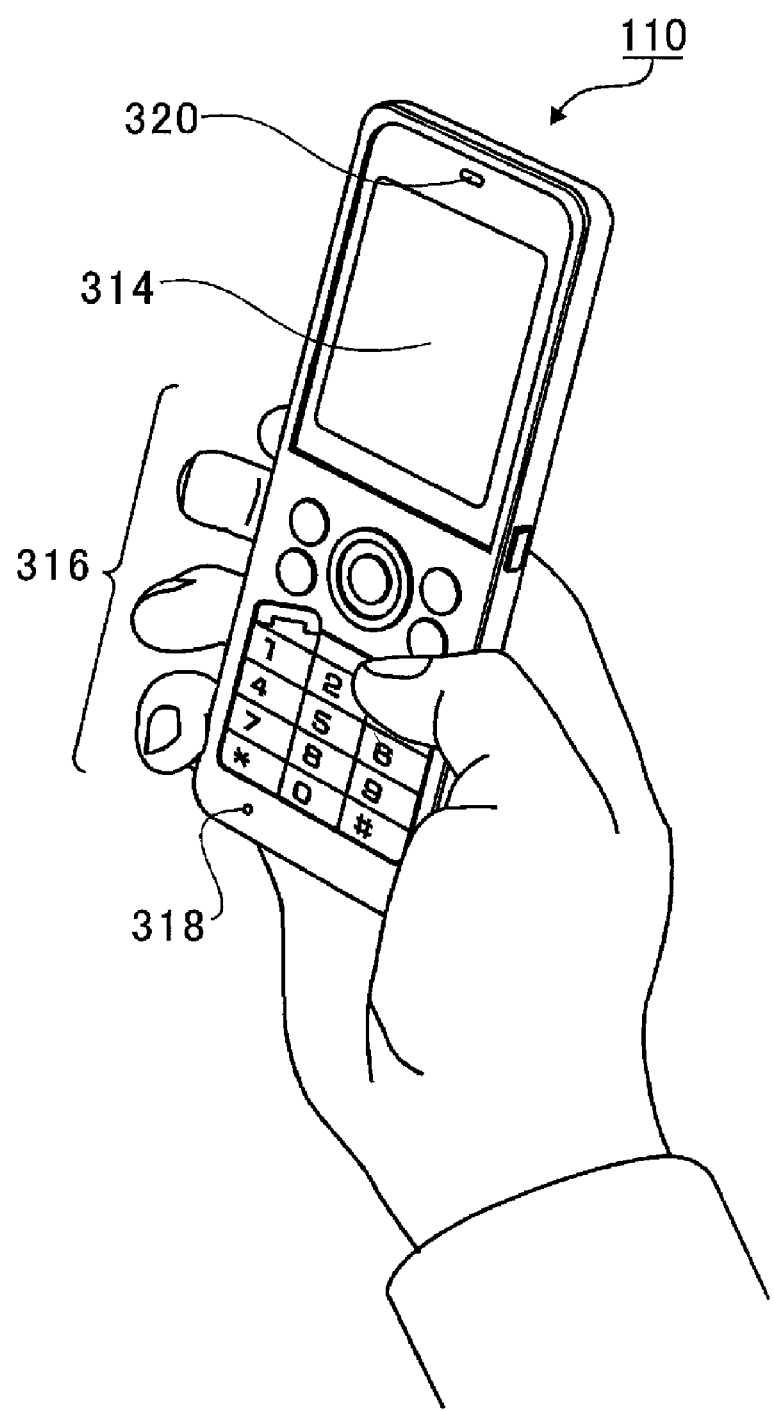
FIG. 5 is a perspective view showing appearance of a PHS terminal.

FIG. 4 is a functional block diagram showing hardware configuration of the PHS terminal 110. FIG. 5 is a perspective view showing appearance of the PHS terminal 110. The PHS terminal 110 includes a terminal control unit 310, a terminal memory 312, a display unit 314, an operation unit 316, a voice input unit 318, a voice output unit 320, and a terminal wireless communication unit 322.

The terminal control unit 310 manages and controls the whole PHS terminal 110 by means of a semiconductor integrated circuit including a central processing unit (CPU). In addition, the terminal control unit 310 also performs call function, mail transmitting and receiving function, imaging function, music playing function, and TV viewing function by using a program of the terminal memory 312.

The terminal memory 312 is configured by a ROM, RAM, EEPROM, non-volatile RAM, flash memory, HDD, or the like, and stores programs processed in the terminal control unit 310, and voice data, etc.

The display unit 314 is configured by a liquid crystal display, EL (Electro Luminescence), and so on, and can display Web Browser or GUI (Graphical User Interface) of application, stored in the terminal memory 312 or provided from an application relay server (not illustrated) through the communication network 130.

The operation unit 316 is configured by switches such as a keyboard, a cross key, and a joystick, and accepts user's operation input.

The voice input unit 318 is configured by voice recognition means such as a microphone, and converts user's voice input during call into an electric signal, which can be processed in the PHS terminal 110.

The voice output unit 320 is configured by a speaker and converts call counterpart's voice signal received in the PHS terminal 110 into voice to output it. In addition, the unit 320 can output ringtones, operation sound of the operation unit 316, and alarm sound, etc.

The terminal wireless communication unit 322 establishes wireless communication with the micro cell base station 120 or the macro cell base station 122 in the communication network 130 to transmit and receive data. Such wireless communication can use ARIB STD T95 or PHS MoU described above.

In addition, in this embodiment, the terminal control unit 310 also functions as a timing adjustment unit 330, a bias amount calculation unit 332, a carrier sense performing unit 334, and a handover request unit 336.

Once the timing adjustment unit 330 receives SD, which is an adjustment signal for adjusting data transmission timing, from the micro cell base station 120 or the macro cell base station 122, the timing adjustment unit 330 advances or delays transmission timing by predetermined time in a time direction presented in the SD.

The bias amount calculation unit 332 calculates a bias amount of the SD that the timing adjustment unit 330 has received. For example, in the case where the PHS terminal 110 stays at a predetermined location, the wireless wave distance from the micro cell base station 120 or the macro cell base station 122 is not changed, and therefore, it is not necessary to change transmission timing. However, if the PHS terminal 110 moves in one direction, transmission timing is frequently changed, so that the SD content is biased to any one of advancement or delay. If the movement speed is accelerated, the frequency of instructions for advancement or delay is increased. Thus, by calculating the biasing and the frequency of the SD content as a bias amount, it is possible to detect that the PHS terminal 110 is moving in one direction with a high speed.

For example, the bias amount may be the number of consecutive times of adjustment signals for either of advancement or delay. According to this configuration, the consecutiveness of adjustment signals can be detected. Thus, it is possible to perform complete and quick handover between micro cells and a macro cells.

Figure 6:
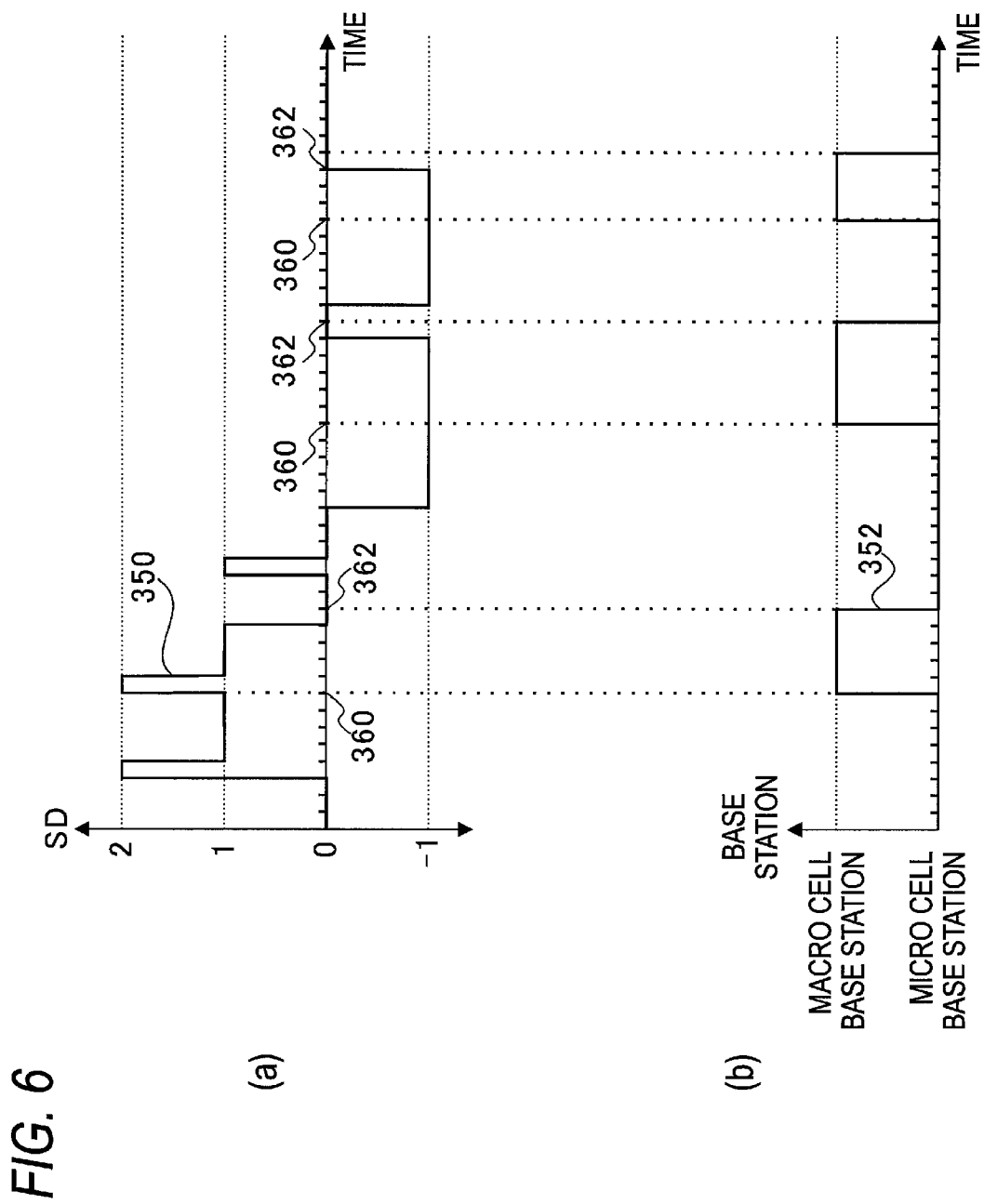
FIG. 6 is a timing chart for explaining an operation of a bias amount calculation unit.

FIG. 6 is a timing chart for explaining an operation of the bias amount calculation unit 332. In particular, FIG. 6(a) shows transition 350 of SD received from the micro cell base station 120 or the macro cell base station 122. FIG. 6(b) shows transition 352 of a base station, for which a handover request is made by the handover request unit 336 as described later, based on FIG. 6(a). The bias amount calculation unit 332 determines whether signals for advancement (SD="1" or "2") or delay (SD="-1") are consecutive, for example, 5 times (first threshold value). And, the bias amount calculation unit 332 hands over from the micro cell base station 120 to the macro cell base station 122 at the time when the signals are consecutive 5 times 360, and hands over from the macro cell base station 122 to the micro cell base station 120 at the time 362 when the consecutiveness is stopped (second threshold value). Here, as the second threshold value, it is determined whether the consecutiveness is stopped. However, the second threshold value may be determined as, for example, other values that are counted predetermined times.

In addition, the bias amount may be the frequency of adjustment signals for either of advancement or delay. The frequency of adjustment signals can be obtained from an average of adjustment signals or results of low-pass filtering. According to this configuration, a reasonable bias amount can be calculated even in case of sudden increase or decrease of adjustment signals, so that complete and quick handover between the micro cells 150 and the macro cells 152 can be performed.

Figure 7:
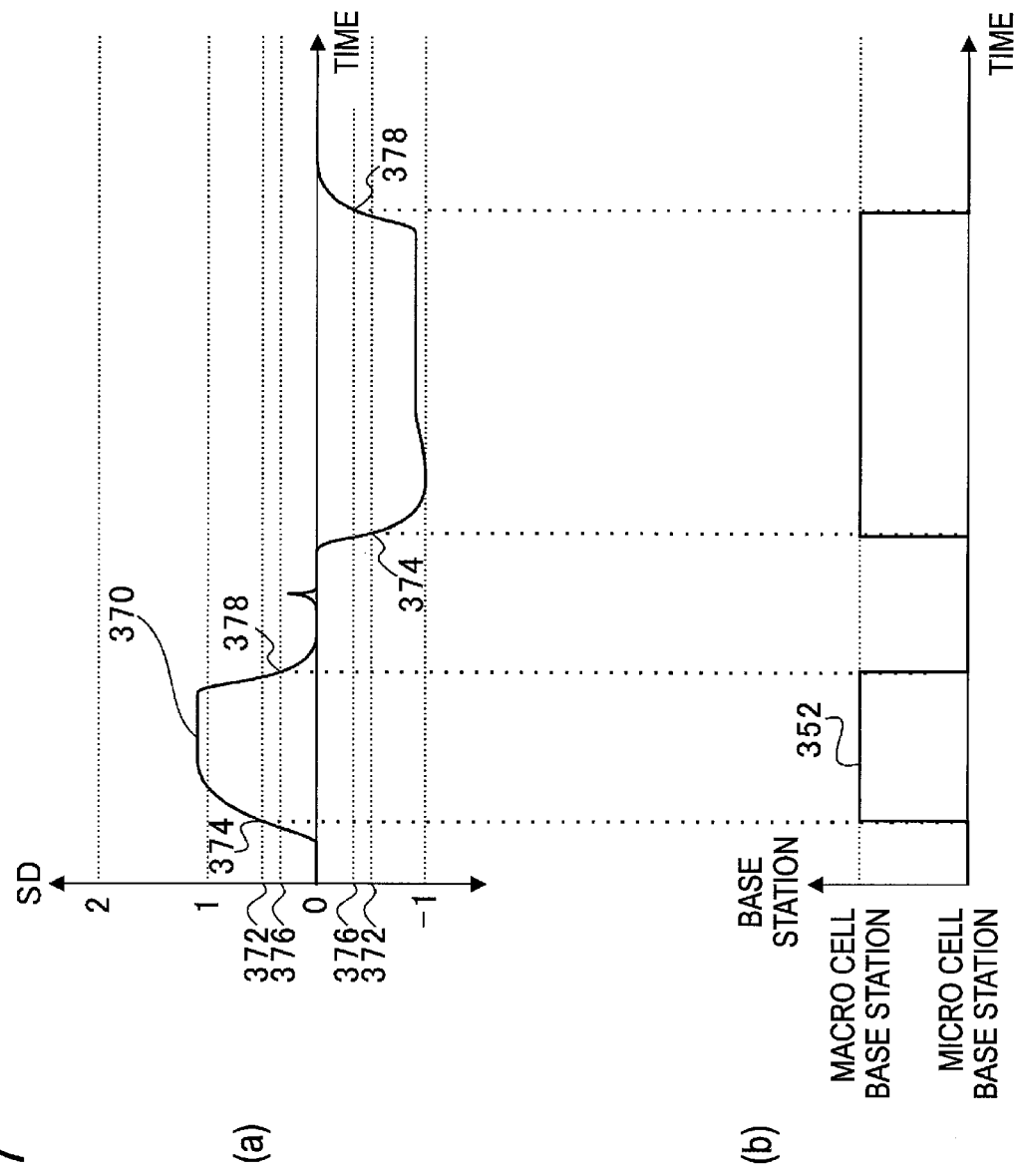
FIG. 7 is a timing chart for explaining another operation of a bias amount calculation unit.

FIG. 7 is a timing chart for explaining another operation of the bias amount calculation unit 332. In particular, FIG. 7(a) shows transition 370 in the case where SD received from the micro cell base station 120 or the macro cell base station 122 is filtered by a low-pass filter (LPF). Similarly to FIG. 6(b), FIG. 7(b) shows transition 352 of a base station, for which a handover request is made by the handover request unit 336 as described later, based on FIG. 7(a). The transition 370 in the case of such filtering indicates a general movement speed of the PHS terminal 110. The bias amount calculation unit 332 hands over from the micro cell base station 120 to the macro cell station 122 at the time 374 when the transition 370 of the filtering is a first threshold value 372, for example, an absolute value is 0.5 or higher. And, the unit 332 hands over form the macro cell base station 122 to the micro cell base station 120 at the time 378 when the transition 370 of the filtering is a second threshold value 376, for example, an absolute value is 0.3 or lower.

If the bias amount calculated by the bias amount calculation unit 332 is the predetermined first threshold value or higher, and if a base station, with which the PHS terminal 110 is performing wireless communication, is the micro cell base station 120, the carrier sense performing unit 334 performs carrier sense to change over into connection to the macro cell base station 122. If the bias amount is the predetermined second threshold value or lower, and if a base station, with which the PHS terminal 110 is performing wireless communication, is the macro cell base station 122, the unit 334 performs carrier sense to change over into connection to the micro cell base station 120.

The handover request unit 336 selects one macro cell base station 122 from one or more of the macro cell base stations 122 extracted through the carrier sense in the carrier sense performing unit 334 and requests handover to the selected macro cell base station 122, to the control server 140. If the base station extracted through the carrier sense is one or more of micro cell base stations 120, the unit 336 selects one micro cell base station 120 from the one or more of micro cell base stations 120 and requests handover to the selected micro cell base station 120.

According to the above-described PHS terminal 110, during ordinary times when the PHS terminal 110 is stopped or moves with a low speed, communication quality is secured through the micro calls 150. If high speed movement is detected, communication coverage is broadened through the macro cells 152. In order to detect the movement speed, SD (adjustment signal), which is a signal prepared in advance for a used standard, is employed, and according to a bias amount of SD, handover from the micro cells 150 to the macro cells 152 is performed. In this way, the frequency of handovers during high speed movement can be reduced, so that stability of wireless communication can be improved, regardless of the movement speed of the PHS terminal 110.

(Micro Cell Base Station 120)

Figure 8:
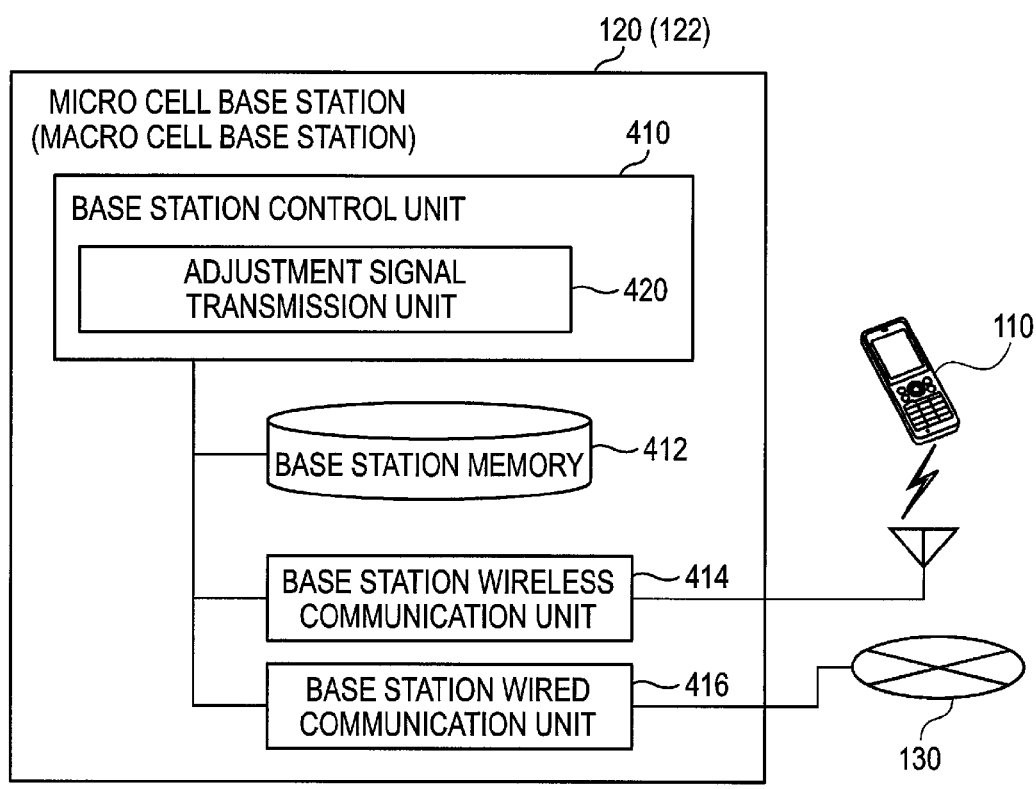
FIG. 8 is a block diagram showing general configuration of a micro cell base station.

FIG. 8 is a block diagram showing general configuration of the micro cell base station 120. The micro cell base station 120 includes a base station control unit 410, a base station memory 412, a base station wireless communication unit 414, and a base station wired communication unit 416. Since the macro cell base station 122 has substantially the same configuration as that of the micro cell base station 120, herein, the descriptions of the micro cell base station 120 will substitute the descriptions of the macro cell base station 122.

The base station control unit 410 manages and controls the whole micro cell base station 120 by means of a semiconductor integrated circuit including a central processing unit (CPU). In addition, the base station control unit 410 controls communication connection to each server or other PHS terminals 110 connected to the communication network 130 by using a program of the base station memory 412.

Moreover, the base station control unit 410 also functions as an adjustment signal transmission unit 420 for transmitting SD, which is an adjustment signal for advancing or delaying data transmission timing in the PHS terminal 110, in order to adjust timing for receiving data from the PHS terminal 110 to a desired timing.

The base station memory 412 is configured by a ROM, RAM, EEPROM, non-volatile RAM, flash memory, HDD, and so on, and stores programs processed in the base station control unit 410, time information, or others.

The base station wireless communication unit 414 establishes communication with the PHS terminal 110 and performs transmitting and receiving data. In addition, the micro cell base station 120 has an identifier capable of discriminating itself from the macro cell base station 122 and transmits the identifier when the PHS terminal 110 performs carrier sense. Such an identifier may be included in CS (Cell Station) ID, which is an identifier of the micro cell base station 120 itself or provided separately. According to this configuration, it is possible to easily extract only the micro cell base station 120 or the macro cell base station 122 when the PHS terminal 110 performs carrier sense, so that processes in the PHS terminal 110 can be simplified, and processing burden and time can be reduced.

The base station wired communication unit 416 can access various servers including the control server 140 through the communication network 130.

(Control Server 140)

Figure 9:
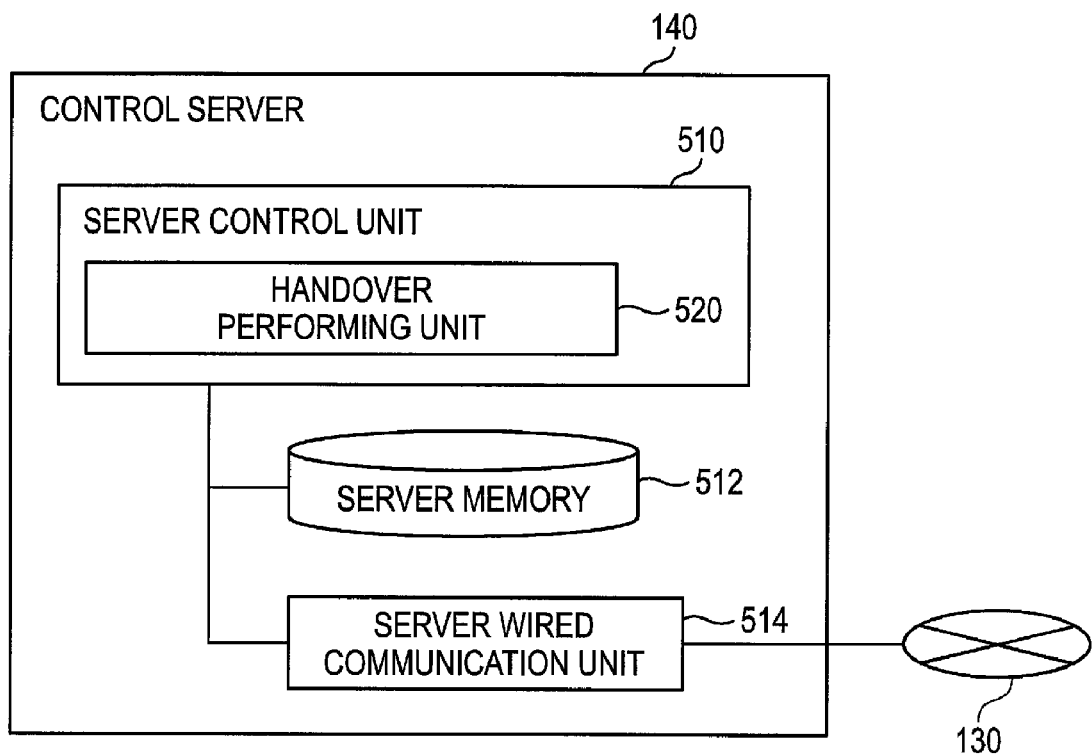
FIG. 9 is a block diagram showing general configuration of a control server.

FIG. 9 is a block diagram showing general configuration of the control server 140. The control server 140 includes a server control unit 510, a server memory 512, and a server wired communication unit 514.

The server control unit 510 manages and controls the whole control server 140 by means of a semiconductor integrated circuit including a central processing unit (CPU). In addition, the server control unit 510 selects the micro cell base station 120, which exists within communication coverage of the PHS terminal 110 requested as a communication counterpart destination, by using a program of the server memory 512 and location registration information of each of the PHS terminals 110, to establish communication between the PHS terminals 110.

In addition, the sever control unit 510 also functions as a handover performing unit 520. The handover performing unit 520 performs handover between the micro cell base stations 120 or between the macro cell base stations 122, which are performing wireless communication with the PHS terminal 110, or handover between the micro cell base station 120 and the macro cell base station 122, in accordance with a handover request from the PHS terminal 110.

The server memory 512 is configured by a ROM, RAM, EEPROM, non-volatile RAM, flash memory, HDD, and so on, and stores programs processed in the server control unit 510, time information, or others.

The server wired communication unit 514 can access the micro cell base station 120 or the macro cell base station 122 through the communication network 130.

In addition, this embodiment describes an example that the control server 140 independently performs handover with the micro cell base stations 120, and etc. However, the control server is not limited thereto. The micro cell base station 120 or the macro cell base station 122 may have the function of the control server 140. The micro cell base station 120 or the macro cell base station 122, which is performing communication with the PHS terminal 110, may access the base stations 120, 122 of the handover destinations designated by the PHS terminal 110 to establish the communication and disconnect the communication with itself and the PHS terminal 110.

Subsequently, a wireless communication method of performing handover in the wireless communication system 100 described above will be described.

(Wireless Communication Method)

Figure 10:
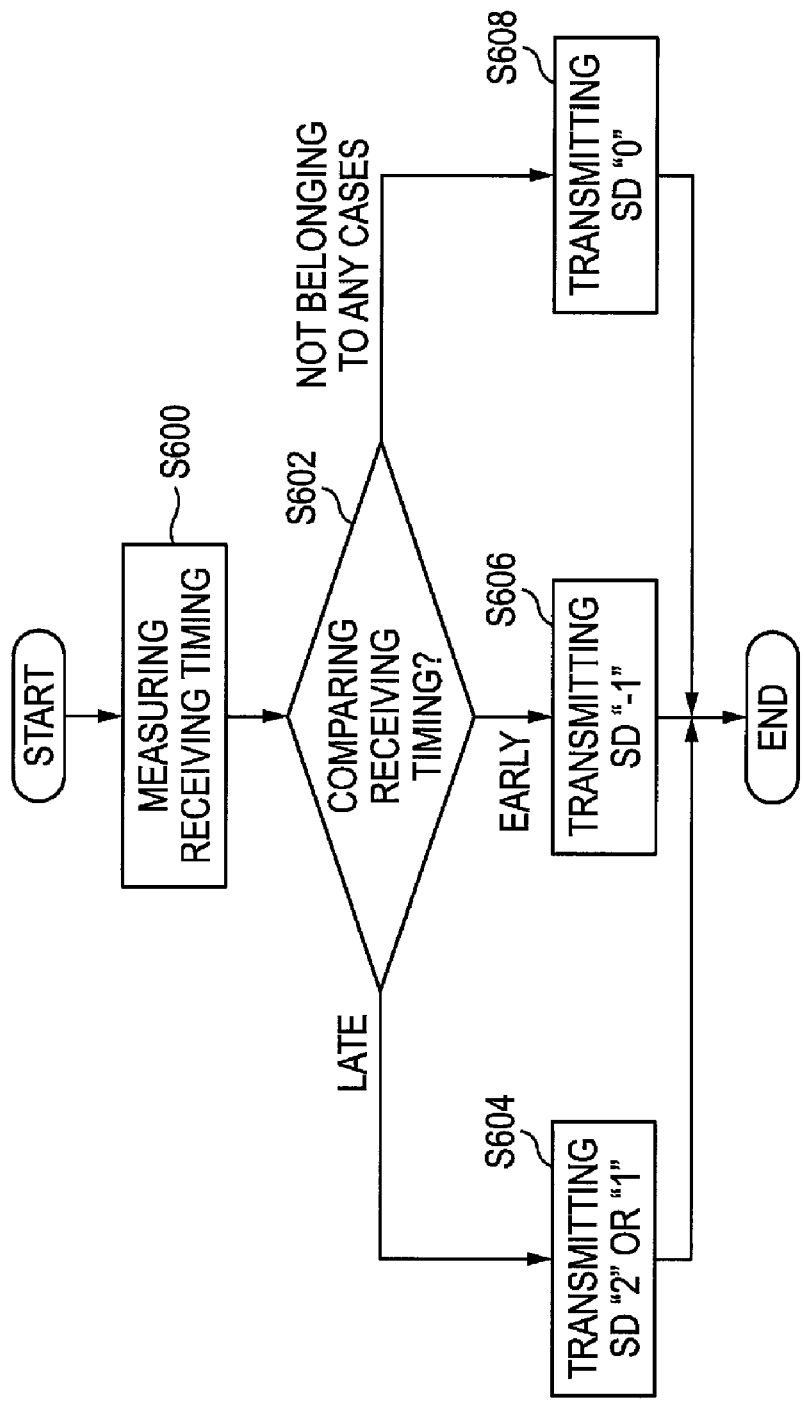
FIG. 10 is a flow chart showing a flow of processes of a wireless communication method.
Figure 11:
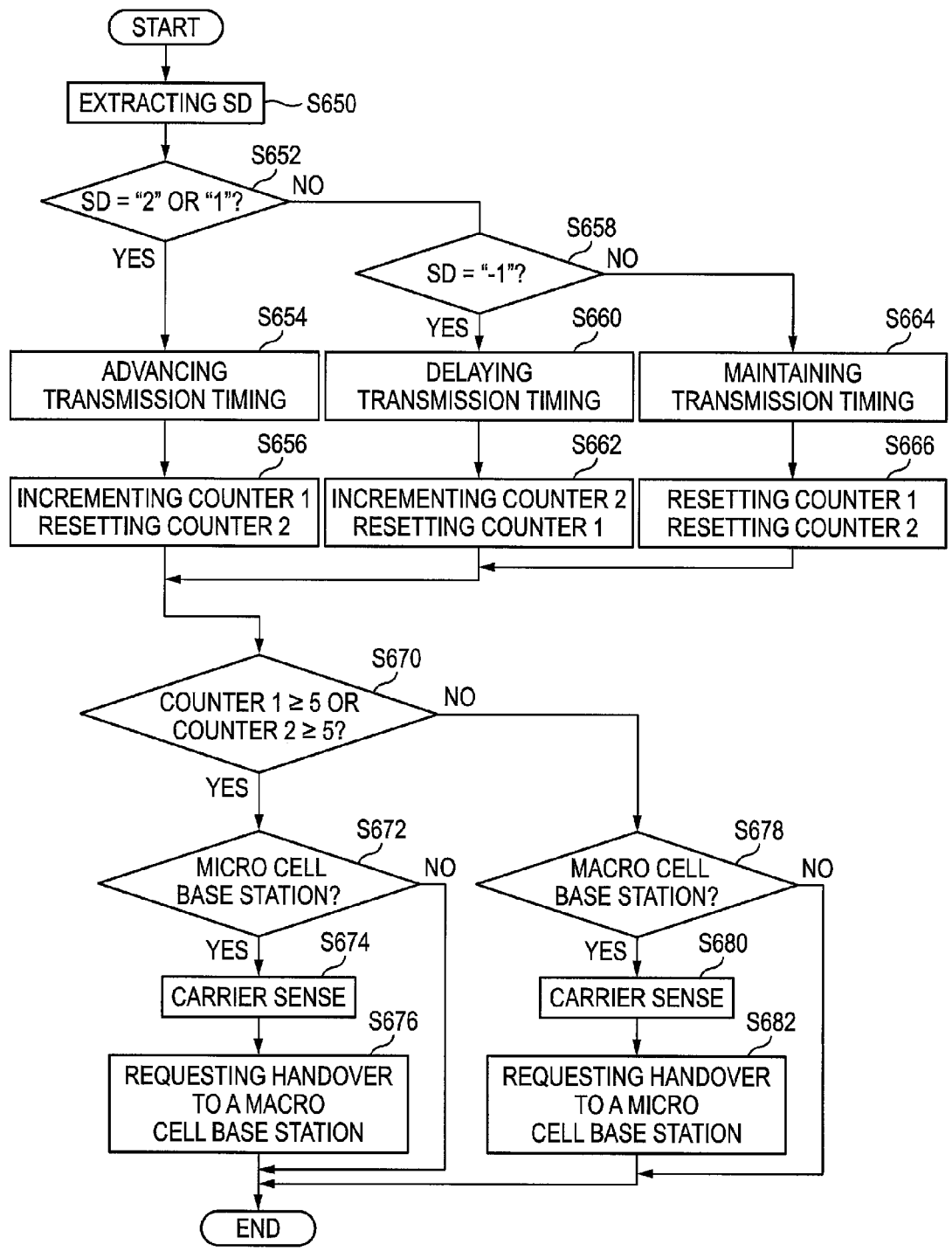
FIG. 11 is a flow chart showing a flow of processes of a wireless communication method.

FIGS. 10 and 11 are flow charts showing a flow of processes of the wireless communication method. In particular, FIG. 10 shows processing in the micro cell base stations 120, and FIG. 11 shows processing in the PHS terminal 110, especially, processing, in which the number of consecutive times of same adjustment signals in SD is used as a bias amount.

With reference to FIG. 10, the micro cell base station 120 measures timing for receiving data from the PHS terminal 110 (S600) and compares the receiving timing with desired receiving timing (S602). If such timing for receiving data from the PHS terminal 110 is late, SD ("2" or "1") for advancing timing according to a deviation amount of the timing is transmitted (S604). If the receiving timing is early, SD ("–1") for delaying timing is transmitted (S606). If the timing does not belong to any of the cases, SD ("0") for maintaining a current status is transmitted (S608).

With reference to FIG. 11, the PHS terminal 110 extracts SD from an anchor channel from the micro cell base station 120 or the macro cell base station 122 (S650) and determines whether the SD value is "2" or "1" (S652). If the SD is "2" or "1," the timing adjustment unit 330 advances transmission timing by time corresponding to the value, "2" or "1" (S654). And, the unit 330 increments counter 1 that counts an instruction to advance transmission timing and resets counter 2 that counts an instruction to delay transmission timing (S656).

In determining SD (S652), if the SD is not "2" or "1," it is determined whether the SD is "–1" (S658), and if the SD is "–1," the timing adjustment unit 330 delays transmission timing by time corresponding to the numeral, "–1" (S660). And, the unit 330 increments counter 2 and resets counter 1 (S662). In determining SD (S658), if the SD is not even "–1," the SD is regarded as "0," namely, an instruction to maintain a current state, so that current transmission timing is maintained (S664), and the counters 1 and 2 are reset (S666).

Subsequently, it is determined whether a counted value for either counter 1 or 2 is a predetermined value, herein, 5 or higher (S670). If the counted value is 5 or higher, and if a base station, with which the PHS terminal 110 is performing wireless communication, is the micro cell base station 120 (S672), carrier sense is performed (S674), and handover to the macro cell base station 122 is requested (S676).

In addition, if counted values for both counters 1 and 2 are lower than the predetermined value, it is determined whether or not a base station, with which the PHS terminal 110 is performing wireless communication, is the macro cell base station 122 (S678). If a base station, with which the PHS terminal 110 is performing wireless communication, is the macro cell base station 122, carrier sense is performed (S680), and handover to the micro cell base station 120 is requested (S682).

In accordance with the handover request from the PHS terminal 110 as described above, the control server 140 performs handover between the PHS terminal 110 and the micro cell base station 120 or the macro cell base station 122.

In the wireless communication method as well that has been described, a movement speed of the PHS terminal 110 is estimated by using a signal prepared in advance for a used standard to select an appropriate base station, so that stability of wireless communication can be improved, regardless of the movement speed of the PHS terminal 110.

(Second Embodiment: Micro Cell Base Station 720, Macro Cell Base Station 722)

In the above-described First Embodiment, the PHS terminal 110 calculates a bias amount of SD, which is an adjustment signal, to determine high speed movement. However, the party for transmitting SD, i.e., the micro cell base station 720 or the macro cell base station 722, as well as the party for receiving SD, may also calculate a bias amount of SD. In this embodiment, instead of the PHS terminal 110, the micro cell base station 720 or the macro cell base station 722 calculates a bias amount of SD transmitted to the PHS terminal 110 to determine a movement speed of the PHS terminal 110.

Figure 12:
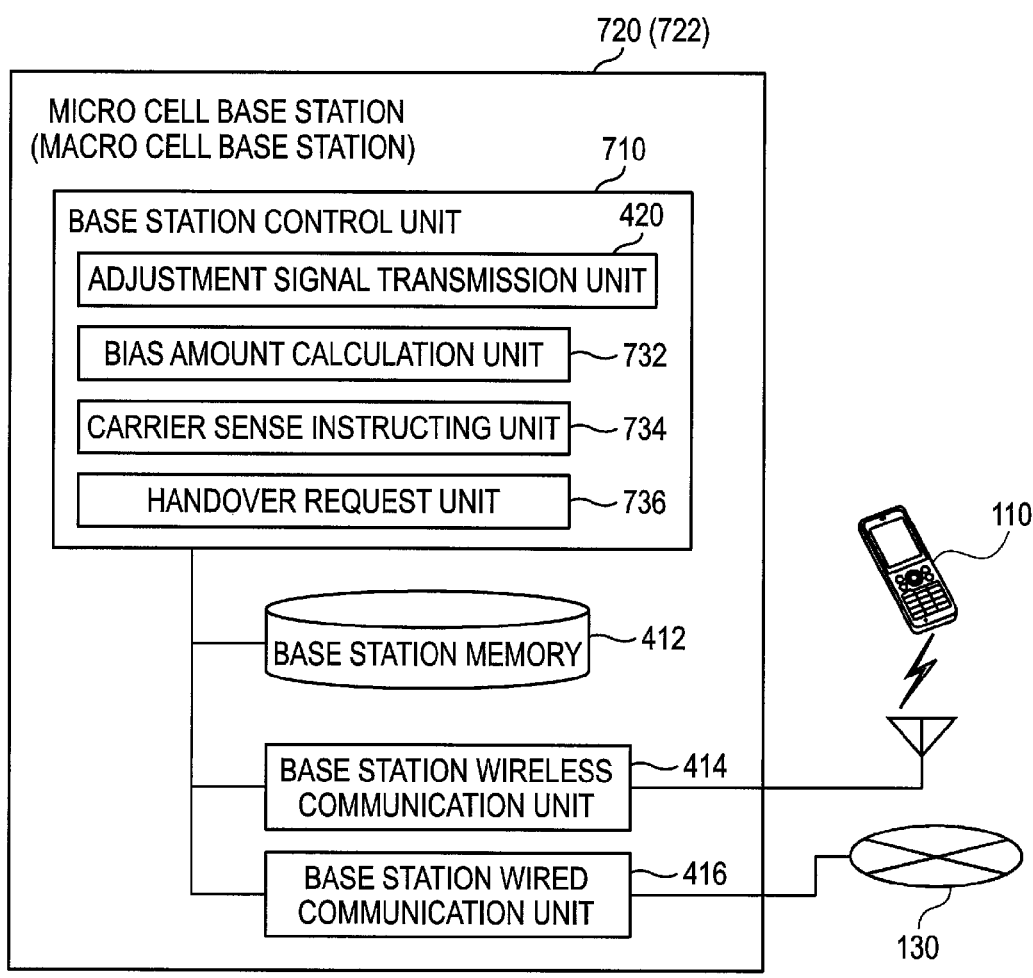
FIG. 12 is a block diagram showing general configuration of a micro cell base station in a second embodiment.

FIG. 12 is a block diagram showing general configuration of the micro cell base station 720. The micro cell base station 720 includes a base station control unit 710, a base station memory 412, a base station wireless communication unit 414, and a base station wired communication unit 416. Since the base station memory 412, the base station wireless communication unit 414, and the base station wired communication unit 416 have substantially the same functions as described in the First Embodiment, repeated descriptions thereof are omitted. Hereinafter, the base station control unit 710 having different configuration will be described. In addition, since the configuration of the macro cell base station 722 also is substantially the same as that of the micro cell base station 720, hereinafter, the descriptions of the micro cell base station 720 will substitute the descriptions of the macro cell base station 722.

The base station control unit 710 manages and controls the whole micro cell base station 720 by means of a semiconductor integrated circuit including a central processing unit (CPU), and functions as an adjustment signal transmission unit 420, a bias amount calculation unit 732, a carrier sense instructing unit 734, and a handover request unit 736.

As in the First Embodiment, the adjustment signal transmission unit 420 transmits SD as an adjustment signal for advancing or delaying data transmission timing in the PHS terminal 110, in order to adjust timing for receiving data from the PHS terminal 110 to a desired timing.

The bias amount calculation unit 732 calculates a bias amount of SD to be transmitted.

If a bias amount calculated by the bias amount calculation unit 732 is a predetermined first threshold value or higher, and if the base station itself is the micro cell base station 720, the carrier sense instructing unit 734 causes the PHS terminal 110 to perform carrier sense to change over into connection to the macro cell base station 722. If the base station itself is the macro cell base station 722, and not the micro cell base station 720, the unit 734 causes the PHS terminal 110 to perform carrier sense to change over into connection to the micro cell base station 720.

The handover request unit 736 selects one macro cell base station 722 or micro cell base station 720 from one or more of macro cell base stations 722 or micro cell base stations 720 extracted through the carrier sense, and requests handover to the selected macro cell base station 722 or micro cell base station 720 to the control server 140.

According to the above-described configuration of the micro cell base station 720 or the macro cell base station 722, a base station having higher processing ability calculates a bias amount of SD. Thus, the processing burden of the PHS terminal 110 can be significantly reduced. As a result, without undergoing processing load in the PHS terminal 110 for determining high speed movement, stability of wireless communication can be improved according to the embodiment described above.

(Another Embodiment)

Unlike the First Embodiment, in the Second Embodiment, the micro cell base station 720 or the macro cell base station 722 calculates a bias amount. The micro cell base station 720 or the macro cell base station 722 may further perform carrier sense and make a handover request to the control server 140.

As described, while the preferable embodiment of the present invention has been described with reference to the accompanying drawings, it goes without saying that the present invention is not limited to the embodiment. It is apparent to one skilled in the art that various modifications and changes can be made within the scope set forth in the claims, and it should be understood that such modifications and changes fall under the technical scope of the present invention.

Additionally, steps in the wireless communication method described in this specification do not need to be sequentially performed in the order described in the flow charts and may be performed in parallel or by subroutine.

The present application is based on Japanese Patent Application No. 2008-085141, filed on Mar. 28, 2008, the disclosures of which are herein incorporated by reference.

Industrial Applicability

The present invention is applicable to a wireless communication system, a mobile station, a base station, and a wireless communication method, which performs handover between a micro cell base station and a macro cell base station under communication environment where a micro cell and a macro cell are overlapped.

The invention claimed is:

1. A wireless communication system comprising:
 a mobile station;
 a plurality of base stations which are capable of performing wireless communication with the mobile station and which include a micro cell base station configuring a micro cell and a macro cell base station configuring a macro cell larger than the micro cell; and
 a control server which controls handover between the plurality of base stations,
 wherein each of the base stations includes an adjustment signal transmission unit which transmits an adjustment signal for advancing or delaying data transmission timing in the mobile station in order to adjust timing for receiving data from the mobile station to a desired timing,
 wherein the mobile station includes a timing adjustment unit which receives the adjustment signal and adjusts the data transmission timing,
 the wireless communication system further comprising:

a bias amount calculation unit which calculates a bias amount of the adjustment signal;

a carrier sense performing unit which, if the bias amount is a first threshold value or higher and if a base station, with which the mobile station is performing wireless communication, is a micro cell base station, performs carrier sense for changing over into connection with a macro cell base station; and a handover request unit which selects one macro cell base station from one or more of macro cell base stations extracted through the carrier sense and which requests handover to the selected macro cell base station, to the control server, wherein the control server includes:

a handover performing unit which performs handover from the micro cell base station which is performing wireless communication with the mobile station, to the selected macro cell base station, in response to the handover request.

2. The wireless communication system claimed in claim 1, wherein the bias amount calculation unit, the carrier sense performing unit, and the handover request unit are included in the mobile station.

3. The wireless communication system according to claim 1, wherein if the bias amount is a second threshold value or lower, which is lower than the first threshold value, and if a base station, with which the mobile station is performing wireless communication, is a macro cell base station, the carrier sense performing unit performs carrier sense for changing over into connection with a micro cell base station, wherein the handover request unit selects one micro cell base station from one or more of micro cell base stations extracted through the carrier sense and requests handover to the selected micro cell base station, and wherein the handover performing unit performs handover from the macro cell base station which is performing wireless communication with the mobile station, to the selected micro cell base station, in response to the handover request.

4. The wireless communication system according to claim 1, wherein the bias amount is the number of consecutive times of an adjustment signal for either one of advancement or delay.

5. The wireless communication system according to claim 1, wherein the bias amount is a frequency of an adjustment signal for either one of advancement or delay.

6. The wireless communication system according to claim 1, wherein each of the micro cell base station and the macro cell base station has an identifier for identifying itself as being either the micro cell base station or the macro cell base station.

7. The wireless communication system according to claim 1, wherein the adjustment signal is SD (Shift Direction) in an anchor channel in a PHS communication standard MoU.

8. A mobile station capable of performing wireless communication with a plurality of base stations including a micro cell base station configuring a micro cell and a macro cell base station configuring a macro cell larger than the micro cell, the mobile station comprising:

a timing adjustment unit which receives an adjustment signal transmitted from a base station being performing wireless communication with the mobile base station in order to adjust a timing for the base station receiving data from the mobile station to a desired timing, and which adjusts the timing of transmitting the data;

a bias amount calculation unit which calculates a bias amount of the adjustment signal;

a carrier sense performing unit which, if the bias amount is a first threshold value or higher, and if a base station, with which the mobile station is performing wireless communication, is a micro cell base station, performs carrier sense for changing over into connection with a macro cell base station; and a handover request unit which selects one macro cell base station from one or a more of macro cell base stations extracted through the carrier sense and which requests handover to the selected macro cell base station, to a control server which controls handover between the plurality of base stations.

9. A base station capable of performing wireless communication with a mobile station and being either one of a plurality of base stations including a micro cell base station configuring a micro cell and a macro cell base station configuring a macro cell larger than the micro cell, the base station comprising:

an adjustment signal transmission unit which transmits an adjustment signal for advancing or delaying data transmission timing in the mobile station in order to adjust timing for receiving data from the mobile station to a desired timing;

a bias amount calculation unit which calculates a bias amount of the adjustment signal;

a carrier sense instructing unit which if the bias amount is a first threshold value or higher and if the base station itself is a micro cell base station, instructs the mobile station to perform carrier sense to change over into connection with a macro cell base station; and a handover request unit which selects one macro cell base station from one or more of macro cell base stations extracted through the carrier sense and requests handover to the selected macro cell base station, to a control server.

10. A wireless communication method of performing handover in a wireless communication system including a mobile station, a plurality of base stations including a micro cell base station configuring a micro cell and a macro cell base station configuring a macro cell larger than the micro cell, and a control server which controls handover between the plurality of base stations, wherein the base station transmits an adjustment signal for advancing or delaying data transmission timing in the mobile station in order to adjust timing for receiving data from the mobile station to a desired timing, wherein the mobile station receives the adjustment signal and adjusts the data transmission timing, wherein either of the mobile station or the base station calculates a bias amount of the adjustment signal, if the bias amount is a first threshold value or higher, and a base station, with which the mobile station is performing wireless communication, is a micro cell base station, performs carrier sense for changing over into connection with a macro cell base station, and selects one macro cell base station from one or more of macro cell base stations extracted through the carrier sense, and requests handover to the selected macro cell base station, to the control server, and wherein the control server performs handover from the micro cell base station which is performing wireless communication with the mobile station to the selected macro sell base station, in response to the handover request from the mobile station.

11. The wireless communication method according to claim 10, wherein the calculating of the bias amount, the performing of carrier sense, and the request for handover are performed by the mobile station.

* * * * *